E. THOMSON.
MEASUREMENT OF SMALL PRESSURES.
APPLICATION FILED JULY 31, 1912.
1,190,044.
Patented July 4, 1916.
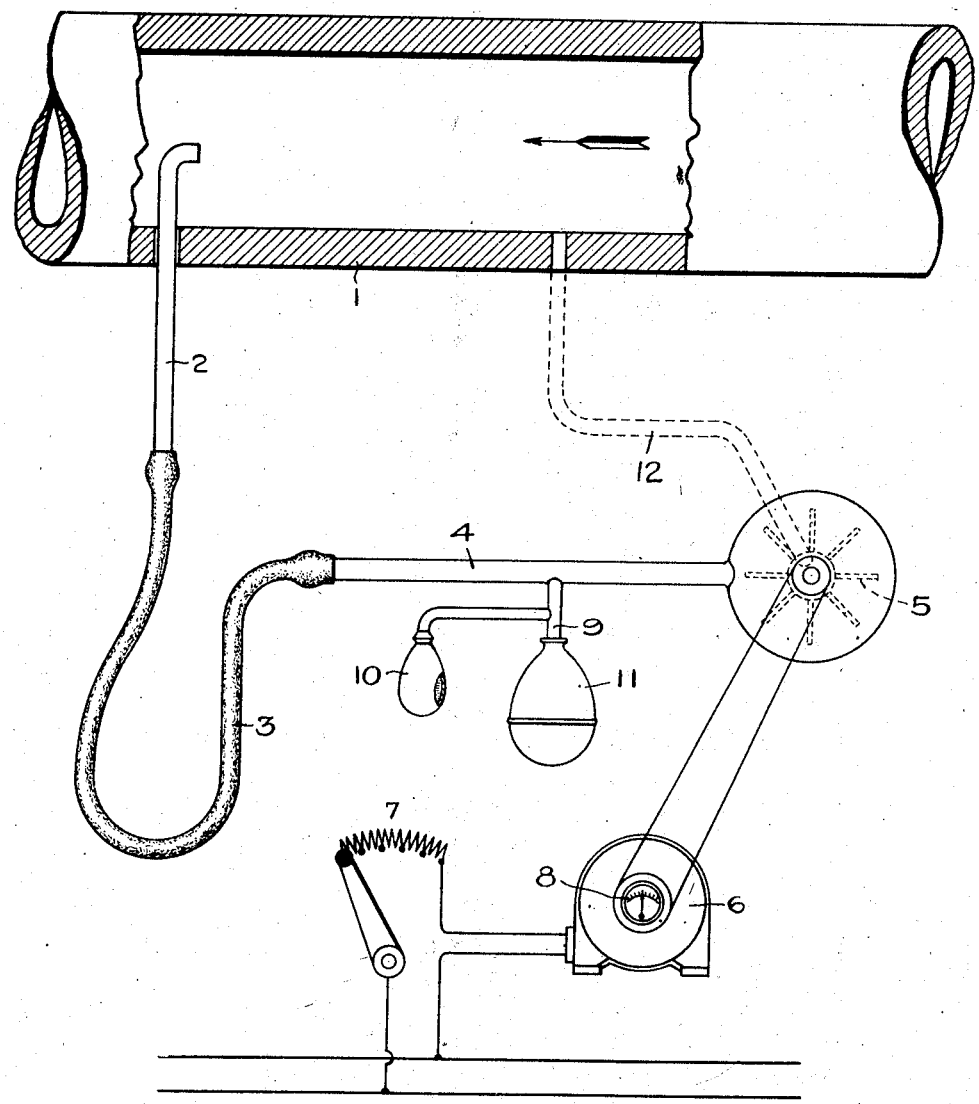
Witnesses:
Marcus L. Byng
J. Ellis Glen
Inventor
Elihu Thomson
by Albert G. Davis
Att'y.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

MEASUREMENT OF SMALL PRESSURES.

1,190,044.    Specification of Letters Patent.    Patented July 4, 1916.

Application filed July 31, 1912. Serial No. 712,439.

*To all whom it may concern:*

Be it known that I, ELIHU THOMSON, a citizen of the United States, residing at Swampscott, county of Essex, State of Massachusetts, have invented certain new and useful Improvements in Measurement of Small Pressures, of which the following is a specification.

This invention relates to the measurement of small gas pressures and also to the measurement of flow, where the flow is of low velocity. In such case, it is found that none of the methods, heretofore in use, satisfies the conditions sufficiently well where the pressures are a very small fraction of an atmosphere, as in the case of gases passing through furnace ducts. Of course, the mercury manometer is entirely out of the question, as the disturbance of the mercury column is entirely too small. So also with a liquid much less dense, such as water or oil of a known density. Here again, the differences are very difficult to note with accuracy when small, and are complicated with meniscus effects. Moreover, the percentage of error, where the elevation of the column, say is one or two millimeters, must necessarily be large and it is desirable to go sometimes far below this difference in measurement; for example, the pressure developed by ventilating fans, although the volume is very great, may be too low to be measured in any such way, as also is the slow flow of fluids within pipes or ducts.

The present invention provides the means for measurement of the smallest pressures and flows and, at the same time, is not limited to those pressures and flows, but can be applied to measure larger ones, or those which would come within the range of a water manometer. The method I propose is a zero method and consists in producing a pressure by known means of such value as to balance the pressure to be measured; and providing means for indicating the value of such balancing pressure. I also provide a suitable device for indicating the time at which that balance is reached.

The accompanying drawing is a diagrammatic representation of apparatus constructed and arranged for carrying out my invention.

The conduit 1 may represent any duct conveying a fluid, the pressure of which is to be noted as above atmosphere, or it may represent a receptacle, the pressure in which is low and is to be noted. Entering this is a pressure-collecting device which may be a form of Pitot tube, as 2, the position of which may be changed within the duct if desired, by flexible connections, say 3. If mere pressure alone is to be measured without flow a simple connection through the walls of the receptacle is required. The connection 3 leads to one end of an indicating chamber, such as a tube 4 of glass or other transparent material, to the other end of which is connected a small centrifugal fan 5 which is driven at variable speed by a motor 6, the speed of which is under exact control by a variable rheostat or other means 7. The motor has connected with its shaft an accurate speed indicator or tachometer 8. Any means for varying the rotation of the fan may be employed or any means for changing the pressure which it develops during rotation. The object of the fan is to enable one to produce a pressure which is greater or less than that of the pressure to be measured, at will, and, therefore, to produce a pressure which exactly balances the pressure to be measured. The inlet of the fan needs only to be a small hole near the axis, as it has no output. Now it will be evident that if the pressure within the duct 1 is slightly above atmosphere, and the fan is not rotating there will be a slow flow outward through the tube 4.

If, however, the fan be in motion and increased in rotation this flow is reversed at some point. To indicate, however, these conditions, it is necessary to arrange something visible within the glass tube, and for this purpose I have made a side branch 9 through which puffs of smoke may be introduced at intervals to the tube. This may be done manually at will or otherwise. A vessel 10, for example, such as a bottle, may contain a small amount of aqua ammonia, and be connected, as shown, to the side 10 branch 9, while 11 may be a rubber bulb containing a small amount of hydrochloric acid or fuming nitric acid, a few drops being sufficient. On pressing this bulb slightly, a puff of smoke composed of chlorid or nitrite and nitrate of ammonium enters the long tube 4 and in accordance with the conditions of pressure it is seen to move more or less slowly or rapidly, as the case may be, toward the fan or toward the Pitot tube, but by adjusting the speed of the fan, it will be possible to so balance the pressures that the entering puff will stand almost stationary or at least move with comparative slowness in either direction. At this time the readings of the tachometer or speed indicator are taken and by moving the mouth of the Pitot tube directed against the flow within the duct 1 to the different positions readings can be taken at any part of the duct. By turning the end of the tube so as to be at right angles to the position shown the pressure within the duct can be balanced so that if it be, so-to-speak, a static pressure above atmosphere, this can be balanced. Then by turning it face to the flow, the additional pressure balanced and measured gives the rate of flow, it being understood that the pressure developed by the fan is in proportion to the square of the speed of revolution.

If it be desired to eliminate the actual pressure regardless of flow as a factor in the measurement, it is only necessary to connect, as is shown in dotted lines, 12, a tube from the interior of the duct or chamber to the entrance of the fan. It is, of course, necessary in using the apparatus to have calibrated the fan or at least to have made it of such known dimensions that under certain conditions or speeds it will develop certain pressure. For example, it may be driven at such a speed as to develop a measurable pressure by the water column manometer. Since it follows the law that the pressure is the square of the speed, the speeds corresponding to the lower pressures may easily be determined. It will be noticed too, that when the balance is obtained between the two pressures there is no duty on the fan, and no flow, the measurement then being a strictly zero measurement. It only remains to say that the method which has been outlined can be applied where the pressures are below the atmosphere or where the effect is that of a suction by reversing the function of the fan and making the exhaust end of the fan communicate with the glass indicating tube. For very low pressure it is to be understood that the fan can be of very small dimensions, and that if it be of large dimensions, its speed must be proportionately low. Where the measurements concern gases of different temperatures, corrections of course must be made for the expansion due to this temperature in arriving at the actual velocity of flow, but where the mass which passes a given point is concerned, irrespective of its state of expansion or contraction by variations in temperature, these corrections will not be needed. It follows also that the readings are obtained as in relation to the atmospheric pressure, which, rising and falling, may be supposed to affect the gases in the duct 1 as well as the outside air alike, and what is measured is, therefore, the difference from atmosphere. If, however, the receiver, or duct 1 was so situated that the gases therein existing at a low pressure were not affected by the barometric changes, as where the vessel was practically closed, then it would be necessary to allow for the outside changes in barometric pressure in arriving at any proper estimate of absolute pressure in the duct or receptacle. Inasmuch, however, as the method is most applicable to such things as furnace ducts or ventilating ducts the consideration of barometer need not enter into the case.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is—

1. The method of measuring small fluid pressures, which consists in admitting said pressure to a transparent chamber, introducing a visible gas, setting up in said chamber a counter-pressure sufficient to check the movement of said visible gas and measuring the energy required to produce said counter-pressure.

2. Means for measuring small fluid pressures, comprising a pressure collecting device, a chamber connected therewith, a counter-pressure producing device connected with said chamber, means for operating the same, devices for indicating the value of such counter-pressure, and means for introducing a puff of visible gas into said chamber.

3. Means for measuring small fluid pressures, comprising a Pitot tube, a glass tube having one end connected therewith, a rotary fan blower connected with the other end of said tube, a motor for driving said fan, means for indicating the pressure set up by said fan blower, and means for injecting into said tube a puff of smoke.

4. Means for measuring small fluid pressures, comprising a Pitot tube, a glass tube having one end connected therewith, a rotary fan blower connected with the other end of said tube, an electric motor for driving said fan, means for regulating the speed of said motor, means for indicating its speed, a branch pipe leading from said tube, and receptacles connected therewith for holding chemicals adapted to produce a puff of smoke in said branch pipe and tube.

In witness whereof, I have hereunto set my hand this twenty-seventh day of July, 1912.

ELIHU THOMSON.

Witnesses:
JOHN A. MCMANUS, Jr.,
FRANK G. HATTIE.